US009604569B1

(12) United States Patent
Salter et al.

(10) Patent No.: US 9,604,569 B1
(45) Date of Patent: Mar. 28, 2017

(54) WINDOW LIGHTING SYSTEM OF A VEHICLE

(71) Applicant: Ford Global Technologies, LLC, Dearborn, MI (US)

(72) Inventors: Stuart C. Salter, White Lake, MI (US); Paul Kenneth Dellock, Northville, MI (US); Sleiman N. Abdelnour, Macomb, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/213,921

(22) Filed: Jul. 19, 2016

(51) Int. Cl.

| | |
|---|---|
| ***B60Q 1/26*** | (2006.01) |
| ***B60Q 3/02*** | (2006.01) |
| ***G09F 13/20*** | (2006.01) |
| ***G09F 3/00*** | (2006.01) |
| ***G09F 21/04*** | (2006.01) |

(52) U.S. Cl.
CPC ......... *B60Q 3/0283* (2013.01); *B60Q 3/0213* (2013.01); *B60Q 3/0293* (2013.01); *G09F 3/00* (2013.01); *G09F 13/20* (2013.01); *G09F 21/04* (2013.01)

(58) Field of Classification Search
CPC .. B60Q 3/0213; B60Q 3/0283; B60Q 3/0293; G09F 3/00; G09F 13/20; G09F 21/04
USPC ......................................... 362/487, 503, 510
See application file for complete search history.

(56) References Cited

U.S. PATENT DOCUMENTS

| | | | |
|---|---|---|---|
| 5,709,453 | A | 1/1998 | Krent et al. |
| 6,031,511 | A | 2/2000 | DeLuca et al. |
| 6,117,362 | A | 9/2000 | Yen et al. |
| 6,494,490 | B1 | 12/2002 | Trantoul |
| 6,508,563 | B2 | 1/2003 | Parker et al. |
| 6,577,073 | B2 | 6/2003 | Shimizu et al. |
| 6,729,738 | B2 | 5/2004 | Fuwausa et al. |
| 6,737,964 | B2 | 5/2004 | Samman et al. |
| 6,773,129 | B2 | 8/2004 | Anderson, Jr. et al. |
| 6,820,888 | B1 | 11/2004 | Griffin |
| 6,851,840 | B2 | 2/2005 | Ramamurthy et al. |
| 6,859,148 | B2 | 2/2005 | Miller |
| 6,871,986 | B2 | 3/2005 | Yamanaka et al. |
| 6,953,536 | B2 | 10/2005 | Yen et al. |
| 6,990,922 | B2 | 1/2006 | Ichikawa et al. |
| 7,161,472 | B2 | 1/2007 | Strumolo et al. |

(Continued)

FOREIGN PATENT DOCUMENTS

| | | |
|---|---|---|
| CN | 101337492 A | 1/2009 |
| CN | 201169230 Y | 2/2009 |

(Continued)

OTHER PUBLICATIONS

Lim, Anthony, Lexus IS 250 updated again in Malaysia for 2011, web page, Nov. 29, 2010, paultan.org, paultan.org/2010/11/29/lexus-is-250-updated-again-my-2011-introduced-in-malaysia/.

*Primary Examiner* — Jason Moonhan
(74) *Attorney, Agent, or Firm* — Vichit Chea; Price Heneveld LLP

(57) ABSTRACT

A vehicle lighting system is provided herein and includes a window of a vehicle. A light-producing assembly is coupled to the window and includes a photoluminescent member configured to luminesce in response to excitation light provided by a light source and a decorative member for concealing the photoluminescent member, wherein the photoluminescent member luminesces to accentuate an indicium defined by the decorative member.

20 Claims, 3 Drawing Sheets

(56) References Cited

U.S. PATENT DOCUMENTS

| | | | |
|---|---|---|---|
| 7,213,923 | B2 | 5/2007 | Liu et al. |
| 7,264,366 | B2 | 9/2007 | Hulse |
| 7,264,367 | B2 | 9/2007 | Hulse |
| 7,441,914 | B2 | 10/2008 | Palmer et al. |
| 7,501,749 | B2 | 3/2009 | Takeda et al. |
| 7,575,349 | B2 | 8/2009 | Bucher et al. |
| 7,745,818 | B2 | 6/2010 | Sofue et al. |
| 7,753,541 | B2 | 7/2010 | Chen et al. |
| 7,834,548 | B2 | 11/2010 | Jousse et al. |
| 7,862,220 | B2 | 1/2011 | Cannon et al. |
| 7,987,030 | B2 | 7/2011 | Flores et al. |
| 8,016,465 | B2 | 9/2011 | Egerer et al. |
| 8,022,818 | B2 | 9/2011 | la Tendresse et al. |
| 8,066,416 | B2 | 11/2011 | Bucher |
| 8,071,988 | B2 | 12/2011 | Lee et al. |
| 8,097,843 | B2 | 1/2012 | Agrawal et al. |
| 8,136,425 | B2 | 3/2012 | Bostick |
| 8,162,519 | B2 | 4/2012 | Salter et al. |
| 8,163,201 | B2 | 4/2012 | Agrawal et al. |
| 8,178,852 | B2 | 5/2012 | Kingsley et al. |
| 8,197,105 | B2 | 6/2012 | Yang |
| 8,203,260 | B2 | 6/2012 | Li et al. |
| 8,207,511 | B2 | 6/2012 | Bortz et al. |
| 8,232,533 | B2 | 7/2012 | Kingsley et al. |
| 8,247,761 | B1 | 8/2012 | Agrawal et al. |
| 8,286,378 | B2 | 10/2012 | Martin et al. |
| 8,408,766 | B2 | 4/2013 | Wilson et al. |
| 8,415,642 | B2 | 4/2013 | Kingsley et al. |
| 8,421,811 | B2 | 4/2013 | Odland et al. |
| 8,466,438 | B2 | 6/2013 | Lambert et al. |
| 8,506,141 | B2 | 8/2013 | Cannon et al. |
| 8,519,359 | B2 | 8/2013 | Kingsley et al. |
| 8,519,362 | B2 | 8/2013 | Labrot et al. |
| 8,552,848 | B2 | 10/2013 | Rao et al. |
| 8,606,430 | B2 | 12/2013 | Seder et al. |
| 8,624,716 | B2 | 1/2014 | Englander |
| 8,631,598 | B2 | 1/2014 | Li et al. |
| 8,664,624 | B2 | 3/2014 | Kingsley et al. |
| 8,683,722 | B1 | 4/2014 | Cowan |
| 8,724,054 | B2 | 5/2014 | Jones |
| 8,754,426 | B2 | 6/2014 | Marx et al. |
| 8,773,012 | B2 | 7/2014 | Ryu et al. |
| 8,846,184 | B2 | 9/2014 | Agrawal et al. |
| 8,876,352 | B2 | 11/2014 | Robbins et al. |
| 8,952,341 | B2 | 2/2015 | Kingsley et al. |
| 9,006,751 | B2 | 4/2015 | Kleo et al. |
| 9,018,833 | B2 | 4/2015 | Lowenthal et al. |
| 9,057,021 | B2 | 6/2015 | Kingsley et al. |
| 9,065,447 | B2 | 6/2015 | Buttolo et al. |
| 9,187,034 | B2 | 11/2015 | Tarahomi et al. |
| 9,299,887 | B2 | 3/2016 | Lowenthal et al. |
| 2002/0159741 | A1 | 10/2002 | Graves et al. |
| 2002/0163792 | A1 | 11/2002 | Formoso |
| 2003/0167668 | A1 | 9/2003 | Fuks et al. |
| 2003/0179548 | A1 | 9/2003 | Becker et al. |
| 2004/0066644 | A1 | 4/2004 | Chang |
| 2004/0213088 | A1 | 10/2004 | Fuwausa |
| 2006/0087826 | A1 | 4/2006 | Anderson, Jr. |
| 2006/0097121 | A1 | 5/2006 | Fugate |
| 2007/0032319 | A1 | 2/2007 | Tufte |
| 2007/0285938 | A1 | 12/2007 | Palmer et al. |
| 2008/0158510 | A1 | 7/2008 | Tant et al. |
| 2009/0073708 | A1 | 3/2009 | Kino et al. |
| 2009/0219730 | A1 | 9/2009 | Syfert et al. |
| 2009/0251920 | A1 | 10/2009 | Kino et al. |
| 2009/0260562 | A1 | 10/2009 | Folstad et al. |
| 2009/0262515 | A1 | 10/2009 | Lee et al. |
| 2011/0012062 | A1 | 1/2011 | Agrawal et al. |
| 2011/0180728 | A1 | 7/2011 | Sawayanagi |
| 2012/0001406 | A1 | 1/2012 | Paxton et al. |
| 2012/0104954 | A1 | 5/2012 | Huang |
| 2012/0183677 | A1 | 7/2012 | Agrawal et al. |
| 2012/0280528 | A1 | 11/2012 | Dellock et al. |
| 2013/0335994 | A1 | 12/2013 | Mulder et al. |
| 2014/0029281 | A1 | 1/2014 | Suckling et al. |
| 2014/0065442 | A1 | 3/2014 | Kingsley et al. |
| 2014/0103258 | A1 | 4/2014 | Agrawal et al. |
| 2014/0264396 | A1 | 9/2014 | Lowenthal et al. |
| 2014/0266666 | A1 | 9/2014 | Habibi |
| 2014/0373898 | A1 | 12/2014 | Rogers et al. |
| 2015/0046027 | A1 | 2/2015 | Sura et al. |
| 2015/0138789 | A1 | 5/2015 | Singer et al. |
| 2015/0267881 | A1 | 9/2015 | Salter et al. |
| 2016/0016506 | A1 | 1/2016 | Collins et al. |

FOREIGN PATENT DOCUMENTS

| | | | |
|---|---|---|---|
| CN | 201193011 | Y | 2/2009 |
| DE | 29708699 | U1 | 7/1997 |
| DE | 10319396 | A1 | 11/2004 |
| DE | 102011120116 | A1 | 6/2013 |
| EP | 1793261 | A1 | 6/2007 |
| EP | 2228258 | A2 | 9/2010 |
| EP | 2778209 | A1 | 9/2014 |
| JP | 2000159011 | A | 6/2000 |
| JP | 2007238063 | A | 9/2007 |
| JP | 2009006853 | A | 1/2009 |
| WO | 2006047306 | A1 | 5/2006 |
| WO | 2014068440 | A1 | 5/2014 |

WINDOW LIGHTING SYSTEM OF A VEHICLE

FIELD OF THE INVENTION

The present invention generally relates to vehicle lighting, and more particularly, to interior vehicle lighting.

BACKGROUND OF THE INVENTION

Illumination arising from the use of photoluminescent structures offers a unique and attractive viewing experience. It is therefore desired to implement such structures in automotive vehicles for various lighting applications.

SUMMARY OF THE INVENTION

According to one aspect of the present invention, a vehicle lighting system is provided and includes a window of a vehicle. A light-producing assembly is coupled to the window and includes a photoluminescent member configured to luminesce in response to excitation light provided by a light source and a decorative member for concealing the photoluminescent member, wherein the photoluminescent member luminesces to accentuate an indicium defined by the decorative member.

According to another aspect of the present invention, a vehicle lighting system is provided and includes a window of a vehicle. A light-producing assembly is coupled to the window and includes a light source, a photoluminescent member arranged over the light source and configured to luminesce in response to excitation light provided by the light source, and a decorative member for concealing the light source and the photoluminescent member. The photoluminescent member luminesces to accentuate an indicium defined by the decorative member.

According to yet another aspect of the present invention, a vehicle lighting system is provided and includes a window of a vehicle. A light-producing assembly is coupled to the window and includes a light source and a photoluminescent member configured to luminesce in response to excitation light provided by the light source. A power delivery system is provided having a conductive strip provided at an edge of the window and electrically coupled to the light source via a substantially transparent conductive coating coupled to the window.

These and other aspects, objects, and features of the present invention will be understood and appreciated by those skilled in the art upon studying the following specification, claims, and appended drawings.

DETAILED DESCRIPTION OF THE PREFERRED EMBODIMENTS

As required, detailed embodiments of the present invention are disclosed herein. However, it is to be understood that the disclosed embodiments are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

Figure 1:
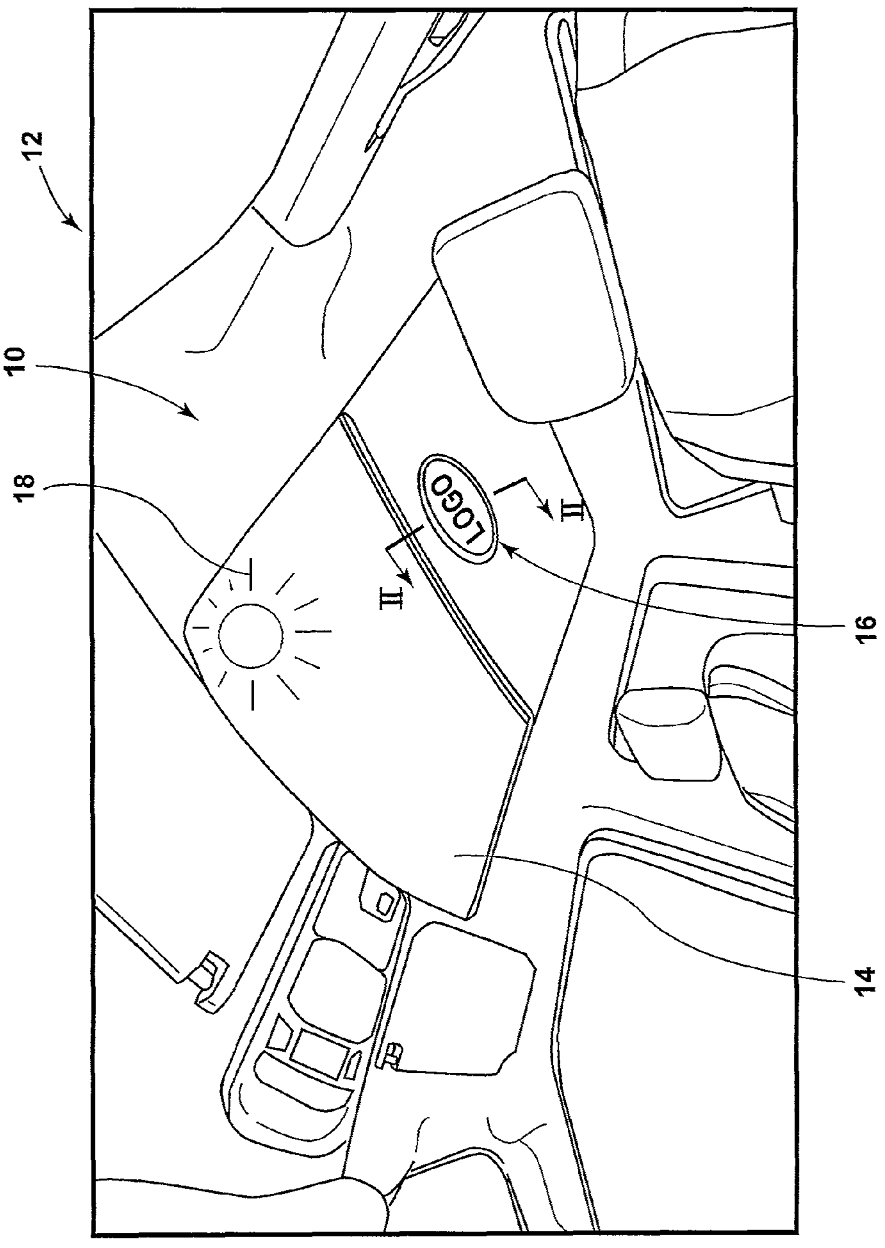
FIG. 1 illustrates a lighting system having a light-producing assembly provided at a window of a vehicle.

Referring to FIG. 1, a lighting system 10 of a vehicle 12 is shown according to one embodiment. The lighting system 10 includes a window 14 and a light-producing assembly 16 coupled to the window 14. In the depicted embodiment, the window 14 is configured as a sunroof and is conventionally mounted to a roof structure of the vehicle 12. In alternative embodiments, the window 14 may be configured as a moonroof, a front windshield, a rear windshield, a side window, or any other window type commonly found on vehicles, and the light-producing assembly 16 may be similarly coupled thereto according to the teachings provided herein. In operation, the light-producing assembly 16 is configured to luminesce in response to excitation light provided by one or more light sources. It is contemplated that the one or more light sources may include a passive light source such as sunlight 18 or other ambient light source. Additionally or alternatively, the one or more light sources may include an active light source as will be described in greater detail herein.

Figure 2:
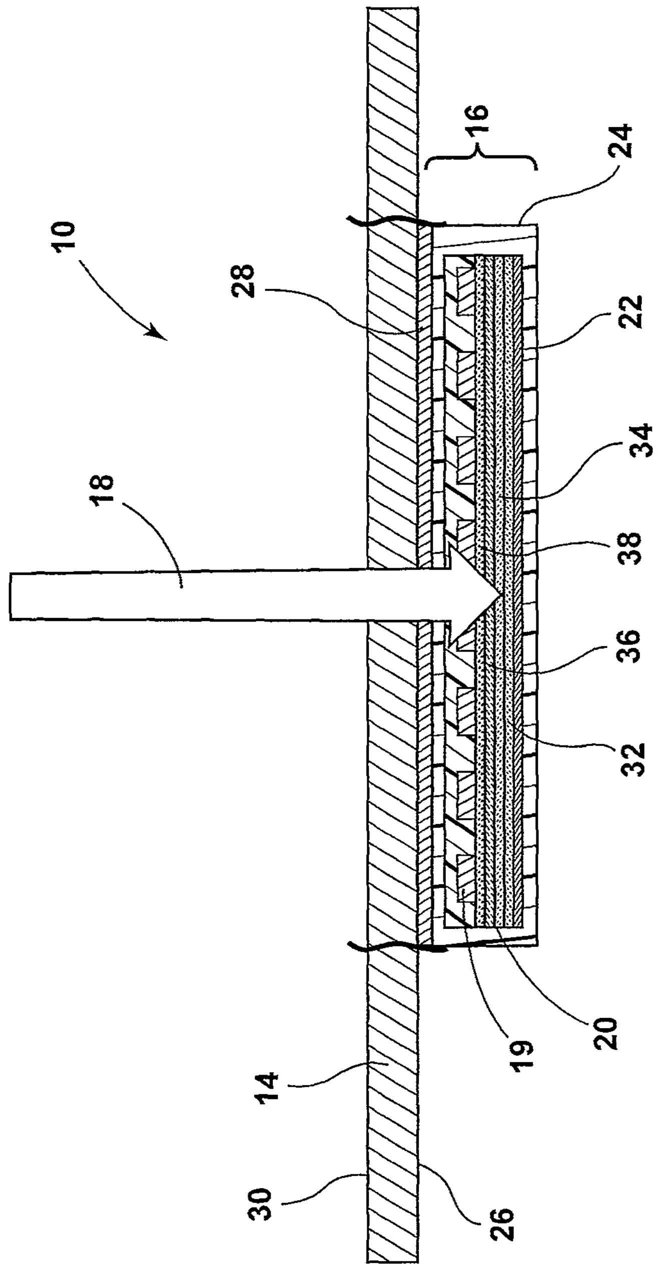
FIG. 2 is a cross-sectional view of the light-producing assembly and corresponding window portion taken along line II-II of FIG. 1.

Referring to FIG. 2, the light-producing assembly 16 is shown in greater detail. The light-producing assembly 16 includes a light source, shown as a printed light-emitting diode (LED) arrangement 19, a photoluminescent member 20, and a decorative member 22 arranged as a stack. In the depicted embodiment, the printed LED arrangement 19, the photoluminescent member 20, and the decorative member 22 are substantially planar and congruent in shape. With respect to the embodiments described herein, the aforementioned components of the stack have a generally oval shape, but may take on other shapes if desired. In assembly, the photoluminescent member 20 is coupled to the printed LED arrangement 19 so as to receive excitation light therefrom, thereby causing the photoluminescent member 20 to luminesce. The photoluminescent member 20 may be applied to the printed LED arrangement 19 through pad printing, painting, flexography, or other known processes. The decorative member 22 is coupled to the photoluminescent member 20 and may be embodied as a colored and/or metalized film that is applied to the photoluminescent member 20 or an ink having a metalized appearance, for example. In some embodiments, the decorative member 22 may be arranged to display an image or text associated with a branding of the vehicle 12. With respect to the embodiments described herein, the decorative member 22 is generally configured to conceal the photoluminescent member 20 and the printed LED arrangement 19, and is substantially light-transmissive such that luminescent light emitted by the photoluminescent member 20 is visible through the decorative member 22. Once the stack is formed, the printed LED arrangement 19, the photoluminescent member 20, and the decorative member 22 are sealed by an overmold 24, which may be constructed from a clear silicone or other light-transmissive material.

With continued reference to FIG. 2, the stack is applied to a vehicle-interior facing side 26 of the window 14 using an optically clear adhesive 28. The stack is arranged relative the window 14 such that the printed LED arrangement 19 is most proximate thereto, followed by the photoluminescent member 20 and the decorative member 22. In alternative embodiments, the light-producing assembly 16 may be integrated with the window 14 or applied to a vehicle-exterior facing side 30 of the window 14. However, locating the stack at the vehicle-interior facing side 26 of the window 14 protects the stack from the elements and allows the same to be retrofitted to pre-existing vehicles.

In operation, the photoluminescent member 20 is configured to luminesce in one or more colors visible through the decorative member 22. According to one embodiment, the photoluminescent member 20 may include a first and a second photoluminescent material 32, 34, each configured to luminesce in response to excitation light provided by the printed LED arrangement 19. The first photoluminescent material 32 may luminesce in a first color whereas the second photoluminescent material 34 may luminesce in a second color that is visually distinguishable from the first color. For example, the first photoluminescent material 32 may luminesce in a blue color whereas the second photoluminescent material 34 may luminesce in a white color. The excitation light provided by the printed LED arrangement 19 may include blue light as blue LEDs are relatively inexpensive and are thus preferable from a cost saving standpoint. However, other colors of light (e.g., ultraviolet) may be used as the excitation light in alternative embodiments.

Additionally, the photoluminescent member 20 may include a third and a fourth photoluminescent material 36, 38, each configured to luminesce in response to excitation light provided by a light source external to the light-producing assembly 16 (e.g., sunlight 18). For example, the third photoluminescent material 36 may luminesce in the first color (e.g., blue) whereas the fourth photoluminescent material 38 may luminesce in the second color (e.g., white). Accordingly, it is to be understood that the printed LED arrangement 19 is configured to enable at least a portion of sunlight 18 to be transmitted therethrough in order to reach the photoluminescent member 20. In such a configuration, the photoluminescent member 20 may be prompted to luminesce via an active light source (e.g., the printed LED assembly 19) and/or a passive light source (e.g., sunlight 18). Thus, on sunny days, the photoluminescent member 20 may receive excitation light primarily from sunlight 18 and the printed LED assembly 19 may be placed in a deactivated state or otherwise activated to provide supplemental excitation light to the photoluminescent member 20. In contrast, when sunlight 18 is unavailable, the printed LED assembly 19 may be activated to provide excitation to the photoluminescent member 20. Thus, it should be appreciated that the printed LED assembly 19 may be controlled based on the availability of sunlight 18.

According to one embodiment, the first, second, third, and fourth photoluminescent materials 32, 34, 36, 38 may include long-persistence phosphors, which are defined herein as being able to store excitation light and release light gradually, for a period of several minutes or hours, once the excitation light ceases to be provided. The decay time may be defined as the time between the end of excitation and the moment when the light intensity of the photoluminescent materials 32, 34, 36, 38 drop below a minimum visibility of 0.32 mcd/m$^2$. A visibility of 0.32 mcd/m$^2$ is roughly 100 times the sensitivity of the dark-adapted human eye, which corresponds to a base level of illumination commonly used by persons of ordinary skill in the art. Accordingly, the first, second, third, and fourth photoluminescent materials 32, 34, 36, 38 may be configured to luminesce at or above an intensity of 0.32 mcd/m$^2$ after being exposed to the excitation light for a period of 10-30 minutes and may continue to luminesce at or above an intensity of 0.32 mcd/m$^2$ for a sustained period of time (e.g., the period may extend 8 hours or longer) after the excitation light ceases to be provided.

The long-persistence phosphors may correspond to alkaline earth aluminates and silicates, for example doped di-silicates, or any other compound that is capable of emitting light for a period of time once excitation light is no longer available. The long-persistence phosphors may be doped with one or more ions, which may correspond to rare earth elements, for example, $Eu^{2+}$, $Tb^{3+}$ and/or $Dy^{3}$. It will be understood that the compositions provided herein are non-limiting examples and any long-persistence phosphors known in the art may be utilized without departing from the teachings provided herein.

Additional information regarding the production of long-persistence photoluminescent structures is disclosed in U.S. Pat. No. 8,163,201 to Agrawal et al., entitled "HIGH-INTENSITY, PERSISTENT PHOTOLUMINESCENT FORMULATIONS AND OBJECTS, AND METHODS FOR CREATING THE SAME," issued Apr. 24, 2012; U.S. Pat. No. 6,953,536 to Yen et al., entitled "LONG PERSISTENT PHOSPHORS AND PERSISTENT ENERGY TRANSFER TECHNIQUE," issued Oct. 11, 2005; U.S. Pat. No. 6,117,362 to Yen et al., entitled "LONG-PERSISTENCE BLUE PHOSPHORS," issued Sep. 12, 2000; and U.S. Pat. No. 8,952,341 to Kingsley et al., entitled "LOW RARE EARTH MINERAL PHOTOLUMINESCENT COMPOSITIONS AND STRUCTURES FOR GENERATING LONG-PERSISTENCE LUMINESCENCE," issued Feb. 10, 2015, all of which are incorporated herein by reference in their entirety.

Moreover, with respect to the embodiments described herein, it is contemplated that other photoluminescent materials, which do not necessarily exhibit long-persistence qualities, may also be utilized without departing from the teachings provided herein. Such photoluminescent materials may have energy converting elements with phosphorescent or fluorescent properties. For example, the photoluminescent material may include organic or inorganic fluorescent dyes including rylenes, xanthenes, porphyrins, and phthalocyanines, or combinations thereof. Additionally or alternatively, the photoluminescent material may include phosphors from the group of Ce-doped garnets such as YAG:Ce. The photoluminescent material may be formulated to have a Stokes shift resulting in the conversion of visible or non-visible light into visible light having an emission spectrum expressed in a desired color, which may vary. Such photoluminescent material may have a limited persistence (e.g., less than about 10 minutes, less than about 5 minutes, less than about 1 minute or no human perceivable persistence).

Figure 3:
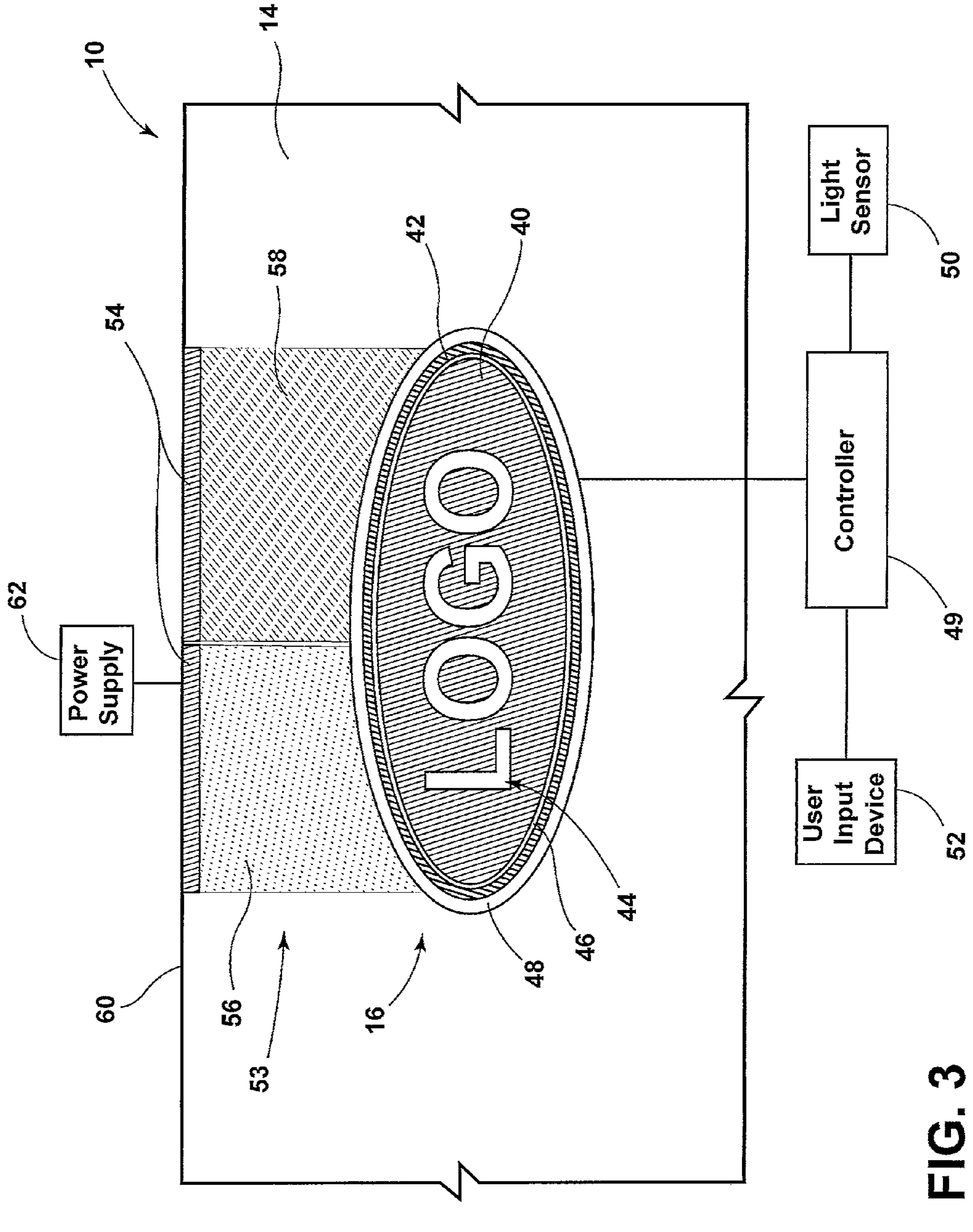
FIG. 3 is a front view of the light-producing assembly serving to illustrate a distribution pattern of a number of photoluminescent materials along with a power delivery system and a control scheme of the lighting system.

Referring to FIG. 3, a front view of the light-producing assembly 16 is shown to illustrate a distribution pattern of the first, second, third, and fourth photoluminescent materials 32, 34, 36, 38. For purposes of illustration and not limitation, the decorative member 22 is configured as a badge associated with a vehicle manufacturer and defines an indicium located centrally thereon and may include a source-identifying LOGO. As shown, the decorative member 22 is depicted as having a first portion defined by darkened areas 40 and 42, and second portion defined by undarkened areas 44, 46, and 48, wherein undarkened area 44 corresponds to the LOGO. In the depicted embodiment, the first portion may be achieved using a blue colored film whereas the second portion may be achieved using a metallized film. Alternatively, the second portion may be achieved using an ink having a metallized appearance. In this specific example, it is desired for the first portion to luminesce in a color that is visually distinguishable from the second portion. Accordingly, the first and third photoluminescent materials 32, 36 may be dispersed in areas of the photoluminescent member 20 corresponding with the first portion whereas the second and fourth photoluminescent materials 34, 38 may be dispersed in areas of the photoluminescent member 20 corresponding with the second portion. In the depicted embodiment, the first and third photoluminescent materials 32, 36 luminesce in a blue light to accentuate the first portion whereas the second and fourth photoluminescent materials 34, 48 luminesce in a white color to accentuate the second portion.

As described herein, the first and second photoluminescent materials 32, 34 may be excited to luminesce in response to active illumination provided by the printed LED arrangement 19 while the third and fourth photoluminescent materials 36, 38 may be excited to luminesce in response to passive illumination provided by sunlight 18. In such an arrangement, the first and second portions of the decorative member 22 may be made to glow in their respective colors based on the availability of sunlight 18. That is, when sunlight 18 is available, the printed LED arrangement 19 is operated in a deactivated state such that the third and fourth photoluminescent materials 36, 38 are solely responsible for generating luminescent light for accentuating the first and second portions of the decorative member 22. When sunlight 18 is no longer available or is limited, the printed LED arrangement 19 may be activated to excite the first and second photoluminescent materials 32, 34 to ensure the first and second portions of the decorative member 22 glow at a desired intensity. While, the light-producing assembly 16 has been shown and described to include the printed LED arrangement 19, it is contemplated that the printed LED arrangement 19 may be omitted in alternative embodiments such that luminescent lighting is only achievable through passive illumination (e.g., the availability of sunlight 18).

With continued reference to FIG. 3, the lighting system 10 also includes a controller 49 operably coupled to the printed LED arrangement 19 for controlling the same. The controller 49 may be communicatively coupled to a light sensor 50 of the vehicle 12 in order to control the activation state of the printed LED arrangement 19 based on information received from the light sensor 50 regarding the availability of passive illumination (e.g., sunlight 18). The controller 49 may also operate the printed LED arrangement 19 based on input received from a user-input device 52, which may include a switch, a touchscreen, or similar input device enabling a user to dictate the activation state of the printed LED arrangement 19. The controller 49 may be variously configured to include one or more programmable logic devices, application specific integrated circuits, digital signal processors, and/or microcontrollers for effectuating control of the printed LED arrangement 19. The controller 49 may be variously located inside the vehicle 12 and may be part of or otherwise communicatively coupled to a vehicle control system.

With further reference to FIG. 3, the lighting system 10 may also include a power delivery system 53 for supplying electrical power to the printed LED arrangement 19. The power delivery system 53 includes conductive strip 54 and a conductive coating having a first portion 56 corresponding to a power delivery line having a second portion 58 corresponding to ground. For concealment purposes, the conductive strip 54 is provided at an edge 60 of the window 14 and the first and second portions 56, 58 are applied directly to the vehicle-interior facing side 26 of the window 14 or otherwise coupled therewith. The conductive strip 54 is electrically coupled to a power supply 62 (e.g., a vehicle power supply) and the printed LED arrangement 19 via the first and second conductive coatings 56, 58. The conductive strip 54 may be made from copper, aluminum, silver, silver ink, or graphene and may be provided at the edge 60 of the window 14 via printing, silk screening, crimping, gluing, or any other suitable means. The conductive strip 54 may be dimensioned to span variously lengths of the edge 60 of the window 14 and may be configured at varying width to satisfy the energy demands of the printed LED arrangement 19. The first and second portions 56, 58 of the conductive coating may have varying width to satisfy the energy demands of the printed LED arrangement 19 and may each include a substantially transparent and electrically conductive material such as tin oxide or clear conductive ink. In such an arrangement, the components of the power delivery system 53 are generally concealed from view. In alternative embodiments, additional power delivery systems may be provided at other window locations.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle lighting system comprising:

a window of a vehicle;

a light-producing assembly coupled to the window and comprising:

a photoluminescent member configured to luminesce in response to excitation light provided by a light source located outside the vehicle; and a decorative member for concealing the photoluminescent member, wherein the photoluminescent member luminesces to accentuate an indicium defined by the decorative member.

2. The vehicle lighting system of claim 1, wherein the photoluminescent member comprises at least one long-persistence phosphor that continues to luminesce for a sustained period of time after the excitation light ceases to be provided.

3. The vehicle lighting system of claim 1, wherein the decorative member comprises one of a metallized film and an ink having a metallized appearance.

4. The vehicle lighting system of claim 1, wherein the light-producing assembly further comprises an overmold configured to seal the photoluminescent member and the decorative member and is adhered to a side of the window facing a vehicle interior such that the decorative member is most vehicle-inboard.

5. The vehicle lighting system of claim 1, wherein the indicium comprises a source-identifying logo.

6. The vehicle lighting system of claim 1, wherein the light source comprises sunlight.

7. The vehicle lighting system of claim 1, wherein the window comprises one of a moonroof, a sunroof, a windshield, and a side window of the vehicle.

8. A vehicle lighting system comprising:

a window of a vehicle; and a light-producing assembly coupled to the window and comprising:

a light source;

a photoluminescent member arranged over the light source and configured to luminesce in response to excitation light provided by the light source and an additional light source located outside the vehicle; and a decorative member for concealing the light source and the photoluminescent member, wherein the photoluminescent member luminesces to accentuate an indicium defined by the decorative member.

9. The vehicle lighting system of claim 8, wherein the light source comprises a printed LED arrangement electrically coupled to a conductive strip provided at an edge of the window via a conductive coating coupled to the window.

10. The vehicle lighting system of claim 9, wherein the conductive strip comprises one of a copper, an aluminum, a silver, a silver ink, and a graphene.

11. The vehicle lighting system of claim 9, wherein the conductive coating comprises one of an indium tin oxide and an optically clear conductive ink.

12. The vehicle lighting system of claim 8, wherein the additional light source comprises sunlight.

13. The vehicle lighting system of claim 8, wherein the window comprises one of a moonroof, a sunroof, a windshield, and a side window of the vehicle.

14. A vehicle lighting system comprising:

a window of a vehicle roof;

a light-producing assembly coupled to the window and comprising:

a light source; and a photoluminescent member configured to luminesce in response to excitation light provided by the light source; and a power delivery system having a conductive strip provided at an edge of the window and electrically coupled to the light source via a substantially transparent conductive coating coupled to the window.

15. The vehicle lighting system of claim 14, further comprising a controller for controlling an operational state of the light source.

16. The vehicle lighting system of claim 15, wherein the controller operates the light source based on information provided by a light sensor.

17. The vehicle lighting system of claim 15, wherein the controller operates the light source based on input provided by a user-input device.

18. The vehicle lighting system of claim 14, wherein the conductive strip comprises one of a copper, an aluminum, a silver, a silver ink, and a graphene.

19. The vehicle lighting system of claim 14, wherein the conductive coating comprises one of an indium tin oxide and an optically clear conductive ink.

20. The vehicle lighting system of claim 14, wherein the light source comprises a printed LED arrangement.

* * * * *